July 7, 1964
W. K. ROBBINS
3,139,720
CONNECTING MEANS FOR CHAIN LINKS AND THE LIKE
Filed Jan. 30, 1961
2 Sheets-Sheet 1
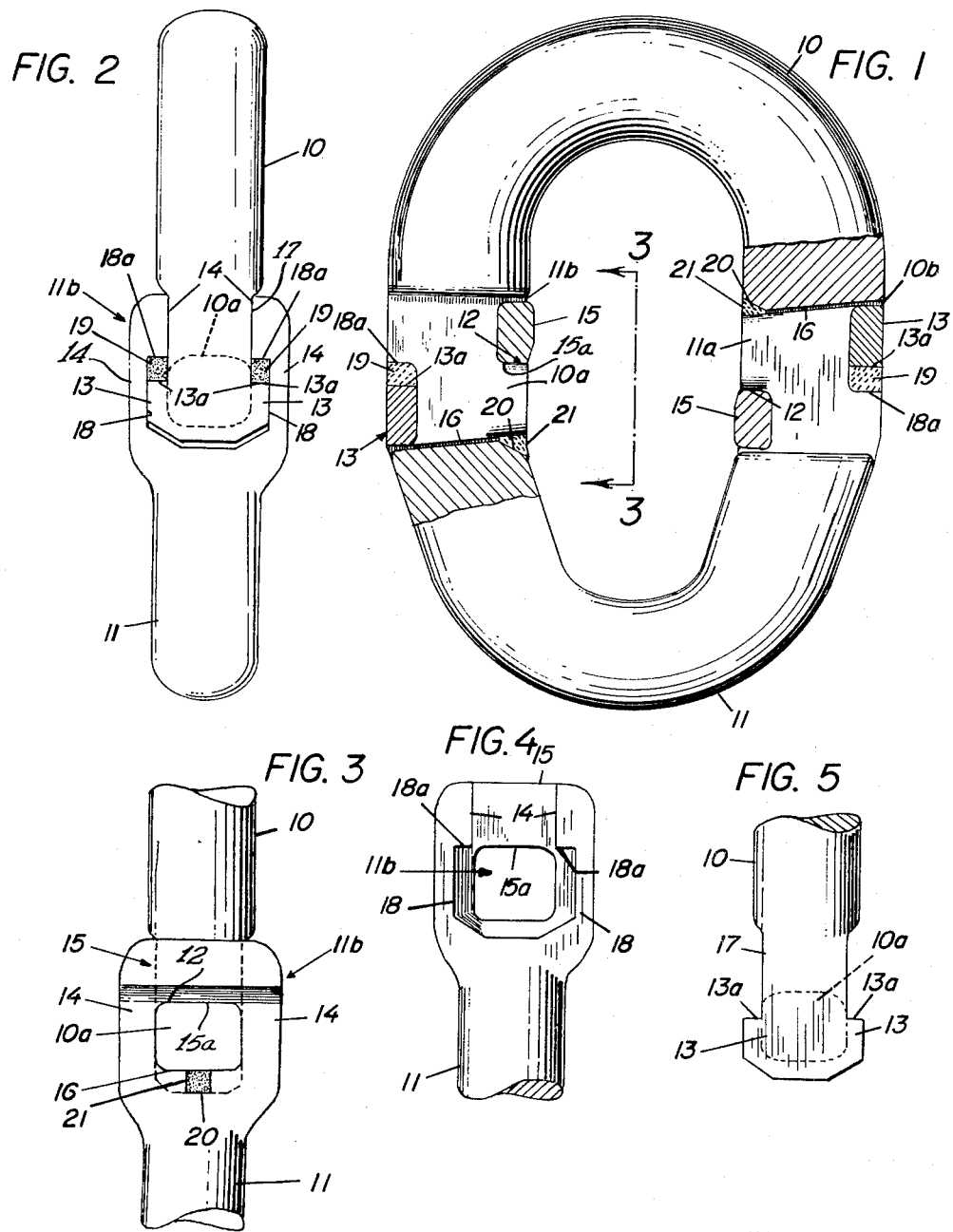
INVENTOR
William K. Robbins
by Eugene E. Stevens
ATTORNEYS July 7, 1964

W. K. ROBBINS 3,139,720

CONNECTING MEANS FOR CHAIN LINKS AND THE LIKE

Filed Jan. 30, 1961

INVENTOR
William K Robbins by Eugene E. Stevens

ATTORNEYS

United States Patent Office 3,139,720
Patented July 7, 1964

3,139,720
CONNECTING MEANS FOR CHAIN LINKS
AND THE LIKE
William K. Robbins, 13453 Moorpark St.,
Sherman Oaks, Calif.
Filed Jan. 30, 1961, Ser. No. 85,735
5 Claims. (Cl. 59—84)

My invention relates primarily to connecting means for multiple section links or connectors for chains, drag-bucket sling elements, etc. although not limited thereto.

Briefly and generally stated, the invention contemplates, in a sectional connector of the class indicated such as is shown in my Patent #2,621,470, dated December 16, 1952, weld means for maintaining the sections operatively connected using, for instance, electric welding rod so that welds can be readily made in the field and will be in compression rather than in tension when the link is in service. A stronger and lower priced link is thus provided. Also, the welds being in compression do not require heat treatment, as they are not subject to the tensile loads that the link halves carry.

It is also an object of the invention to provide a sectional welded closed chain link of general utility, which is long lived, inexpensive to make, and is suitable for use as the original links of factory made chains as well as replacements for broken links.

Various other objects and advantages of my development will be readily apparent to those versed in the art upon reference to the accompanying drawings which disclose certain now preferred examples of the invention.

It is to be understood that the present disclosures are to be taken as illustrative rather than limitative, as the invention is obviously susceptible of various other mechanical expressions within the spirit and scope of the subject matter claimed hereinafter.

In the drawings, wherein the same reference characters have been used to designate the same parts wherever they appear in the several views—

FIG. 1 is an elevational view, partly broken and partly in section of a sectional link embodying my invention;

FIG. 2 is a side edge elevation thereof;

FIG. 3 is a detail view taken on the line 3—3 of FIG. 1;

FIG. 4 is a side edge elevation of the socket-providing end of one of the duplicate link sections;

FIG. 5 is a side elevation of the stud-providing end of the other link section;

Figure 7:
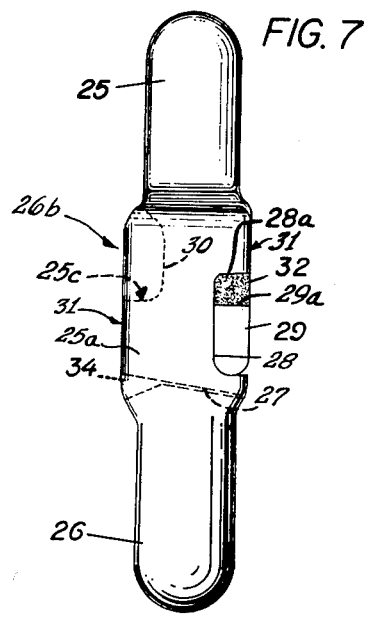
FIG. 7 is a side edge elevation of the link of FIG. 6.

Referring to the drawings by reference characters and turning to the form of invention shown in FIGS. 1–5, inclusive, numerals 10, 11 indicate the U-form and substantially duplicate link sections whose link terminals provide, respectively, the inwardly extending studs 10a, 11a and the outward opening sockets 10b, 11b.

FIGS. 1, 2 and 5 disclose the respective studs 10a, 11a as having the load-supporting shoulders 12 and also that each of said studs has projecting from opposite sides adjacent its rear edge, the load-supporting lugs 13 having planar shoulders 13a.

Each of the respective sockets 10b, 11b are defined by the laterally spaced and parallel side walls 14 which latter are connected by bridges 15 adjacent their inner edges. FIG. 1 indicates that these socket side wall-connecting bridges 15 are located adjacent the free inner end of the related sockets 10b, 11b. Thus, it will be understood that the sockets 10b, 11b in addition to being open at their outer sides, as earlier mentioned, are also open at their free ends. (See FIG. 4.)

The studs 10a, 11a and the adjacent limb portions which are received in the respective sockets 11b, 10b, are reduced in width, as compared to outer limb portions, as indicated at 17 in FIGS. 2 and 5. It will be understood that the sections 10, 11 are assembled to provide the link of FIG. 1 by relative movement of the link sections 10, 11 sidewardly in the same plane to engage the studs in the sockets.

Referring to the outwardly extending studs (10a, 11a) provided planar shoulder-incorporating load-supporting lugs 13 of FIGS. 1, 2 and 5, it will be noted from an inspection of FIGS. 2 and 4 that the socket walls 14 provide elongated seats 18 therefor, each having a planar shoulder 18a. Thus when the sections 10, 11 are assembled, as in FIG. 2, each lug 13 will engage the inner end of its seat 18, but its planar shoulder 13a will be spaced from the outer or load-supportnig planar shoulder 18a of the latter.

When the studs 10a, 11a are assembled in the related sockets 11b, 10b, it will be noted from FIGS. 1 and 2 that the load-supporting shoulders 12 of the studs 10a, 11a make contiguous engagement with the opposed load-supporting edges 15a of the related socket side wall-connecting bridges 15. At this time, the stud provided lugs 13, while engaged in the wall-provided seats 18, are spaced from the outer, or load-sustaining ends 18a thereof, as earlier indicated.

*The Main Features of Novelty FIGS. 1–5*

Although the sectional link structure of my aforementioned Patent #2,621,470 employs socket-seated load-supporting studs with side lugs, pin means or the like are required to hold the link sections assembled. This means some sacrifice in load-sustaining capacity unless production cost is increased by the addition of socket metal. Also the use of assembly-maintaining pins and the drilling of holes therefor are added expense items.

Therefore, as shown in FIGS. 1 and 2, my present construction provides a lower priced and better sectional link by employing weld inserts 19 between the load-sustaining lug ends 13a of the stud-carried lugs 13 and the load-sustaining outer ends 18a of the socket-wall 14 provided seats 18. These weld inserts 19 effectively hold sections 10, 11 connected when the assembled link is under longitudinal load. This is so because weld inserts 19 are in compression rather than in tension when the link 10, 11 is subjected to longitudinal load. Said welds 19 are also effective to resist lateral separation of link sections 10, 11 in the absence of excessive and prolonged chain slapping as occurs in the case of drag bucket chains when the bucket is being dumped. Electric welding rod can be used for either shop or field service, because the link halves carry the full tensile load, with the welds 19 always being in compression, the latter will not require heat treatment.

When the link 10, 11 is to be incorporated in a chain length, or flexible connection, forming a part of such as a drag bucket sling which is subjected to excessive slapping action, the link section assembly-maintaining welds 21 of FIGS. 1 and 3 are also preferably employed to cooperate with welds 19 to prevent lateral separation of link sections 10, 11. Of course under some circumstances, welds 19 can be dispensed with entirely; and in that event, the lugs 13 will be made coextensive in length with the socket wall 14 provided seats 18. Each of the welds 21 is disposed in a cutout 20 in the inner end wall 16 of the respective sockets 10b, 11b to also bind against the opposed end surface of the adjacent stud 10a (or 11a) as indicated in FIGS. 1 and 3. As shown in FIG. 3, the cutouts 20 are preferably located intermediate the side walls 14 of the respective sockets 10b, 11b.

Figure 6:
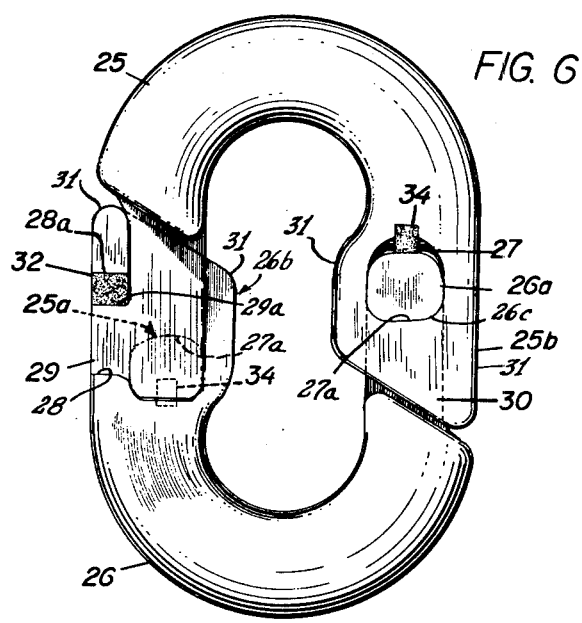
FIG. 6 is an elevational view, partly broken and partly in section of a modified sectional link.
Figure 8:
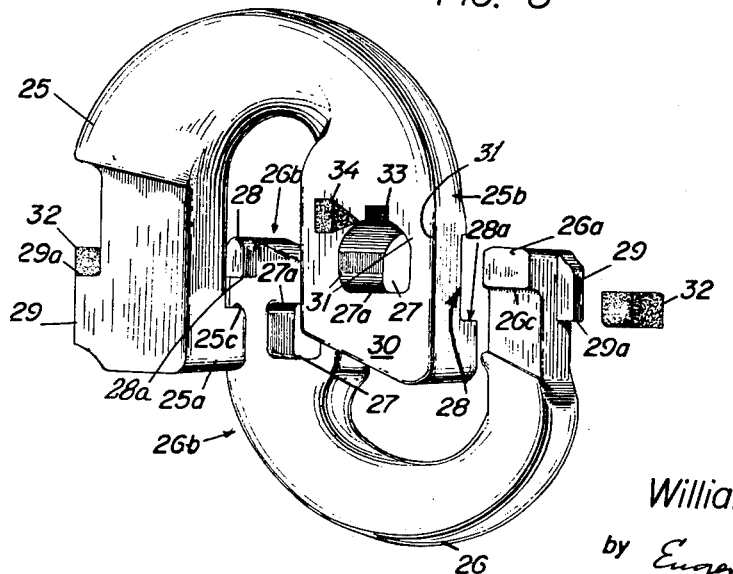
FIG. 8 is a group perspective of the link sections of FIGS. 6 and 7.

Coming now to the form of invention shown in FIGS. 6–8, inclusive, it is to be noted, first off, that the duplicate link sections 25, 26 are duplicates except that one is a "left" and the other a "right," and that they are assembled, or disassembled, by relative movement transversely of the plane of the link, instead of in the plane of the link as in FIGS. 1–5.

Referring to FIGS. 6–8, the limbs of the link sections 25, 26 terminate in the respective inwardly extending transverse studs 25a, 26a and sockets 25b, 26b, as best shown in FIG. 8, the sockets 25b, 26b providing the receiving seats 27 for the respective studs 26a, 25a of the companion link section.

FIG. 8 also illustrates the outer side of each of the studs 25a, 26a as having the outwardly projecting lug 29 which provides the load-sustaining inner end 29a.

When the link sections 25, 26 of FIG. 8 are assembled, as in FIGS. 6 and 7, the load-sustaining shoulders 25c, 26c of the respective studs contiguously engage the load-sustaining shoulder 27a of the bridge 30 which connects the side walls 31 of the respective sockets 25b, 26b.

Also, when the link sections 25, 26 are assembled as indicated in FIGS. 6 and 7, the load-supporting inner ends 29a of stud-carried lugs 29 will be in spaced opposition to the load-supporting end shoulders 28a of socket wall 31 provided recesses 28. Thus welds 32 (which will be in compression in service) can be applied between 28a, 29a for retaining the link 25, 26 sections assembled.

When the link is to be incorporated in a chain which will be subjected to "slapping" in service, additional weld connections 34 are employed to prevent relative lateral link section shifting. These welds 34 are also free of longitudinal link loads in service and can be effectively applied by notching 33 the inner end wall of the socket-provided stud seats 27 for the reception of inserts 34 which bind in notches 33, and also against the related stud 25a (or 26a).

Under some conditions when welds 34 are used, the welds 32 can be dispensed with. In such a case, the stud-provided lugs 29 can, as suggested in connection with FIGS. 1–5, be made long enough to contiguously engage the load-supporting socket wall-provided shoulder 28a.

From the foregoing it will be apparent that I provide a simpler, more durable and less expensive original or repair link than what has gone before; and also one which can be readily assembled in the field or shop using the simplest of electric welding equipment and welding rod comparable to the link material.

All welded type links in use at the present time that I know of have the welds carrying the full tensile load to which the link is subjected. And even when heat treated, weld breaks are frequent. My welds such as 19 and 32, being in compression, will not require heat treatment, as they will not be subject to the major tensile loads the link halves carry.

All chain manufacturing companies can save considerable time and money by employing my present invention by not having to heat treat the full chain assemblies, including connectors, hooks, etc., for drag bucket or other service.

In addition to weld inserts 32, I may provide tack welds 34 in the respective recesses 33 of the socket seats 27 that receive the studs 25a, 26a. Such tack welds 34 bind against the related stud 25a, 26a to further resist relative separating movement of the link sections 25, 26. Use of same is usually unnecessary.

The sections of the assembled links 10, 11 (of FIG. 1) and 25, 26 (of FIG. 6) can of course be separated if desired by chiseling out or otherwise removing the respective welds 19, 21 and 32, 34. But the functionally integral link units of FIGS. 1 and 6 will normally remain intact for the life of the sling or other assembly in which they are incorporated.

A further advantage inherent in the structures described and claimed is the use of the "in-compression" weld inserts 19 and 32 of FIGS. 1 and 6, respectively, assures of a "non-shifting"—(or anti-rattling)—fit of the stud and socket parts. This avoids the necessity for machining etc., to effect a perfect fit of the elements noted.

Having thus described my invention, what I claim is:

1. A connector comprising in combination two separable sections, one section providing a laterally opening side wall-providing socket and the other a laterally projecting stud movable into said socket, said stud and socket having longitudinal load-sustaining planar shoulders disposed substantially normal to the connector axis, said planar stud and socket shoulders being spacedly opposed when the sections are assembled, and an assembly-maintaining and load-sustaining weld in the space between said planar shoulders and bonded to the latter so as to be in compression therebetween when the connector is under longitudinal load.

2. A connector comprising in combination two separable sections, one section providing a laterally opening side wall-providing socket and the other a laterally projecting stud movable into said socket, said stud and socket having interengaging primary longitudinal load-sustaining shoulders, spacedly opposed secondary and planar longitudinal load-sustaining shoulders provided by the assembled socket and stud and located at at least one side of and near the rear end of the stud, and a connector assembly-maintaining weld in the space between said secondary and planar shoulders and bonded to the latter so as to be in compression therebetween when the connector is under longitudinal load, said planar secondary shoulders and weld counteracting any tendency of the stud to rockingly yield as the result of longitudinal primary shoulder load when the connector is in service.

3. The combination set forth in claim 2, and a pair of said spacedly opposed and planar secondary shoulders located at each side of the stud, and a weld interposed therebetween.

4. A link-form connector comprising in combination a pair of substantially duplicate U-form sections, one limb of each section terminating in a laterally extending stud and the other in a laterally opening side wall-incorporating socket, the studs and sockets of the respective sections being interengaged by relative lateral movement of the sections, each stud and the related socket of the other section having spacedly opposed longitudinal link load-sustaining planar shoulders disposed substantially normal to the longitudinal axis of the connector, and an assembly-maintaining and load-sustaining weld in the space between said shoulders and bonded to the latter so as to be in compression therebetween when the connector is under longitudinal load.

5. A link-form connector comprising in combination a pair of substantially duplicate U-form sections, one limb of each section terminating in a laterally extending stud and the other in a laterally opening side wall-incorporating socket, the studs and sockets of the respective sections being interengaged by relative lateral movement of the sections, each stud and the related socket of the other section having opposed interengaging longitudinal link load-sustaining primary shoulders disposed substantially normal to the connector axis, a lug extending laterally from each stud adjacent the rear end of the latter, the sockets having side wall-provided recesses receiving the respective lugs, said lugs and related socket wall-provided recesses providing spacedly opposed secondary longitudinal load-sustaining shoulders disposed substantially normal to the connector axis, and an assembly-maintaining and load-sustaining weld in the space between said secondary shoulders and bonded to the latter so as to be in compression therebetween when the connector is under longitudinal load, said pairs of secondary shoulders and interposed welds counteracting any tendency of the related stud to rockingly yield as the result of longitudinal primary shoulder load when the connector is in service.

References Cited in the file of this patent

UNITED STATES PATENTS

| | | |
|---|---|---|
| Re. 21,093 | Barnes | May 23, 1939 |
| 1,065,564 | Tobin | June 24, 1913 |
| 1,158,307 | Schmidt | Oct. 26, 1915 |
| 1,453,343 | Fay | May 1, 1923 |
| 1,812,123 | Stresau | June 30, 1931 |
| 1,980,126 | Williams | Nov. 6, 1934 |
| 2,621,470 | Robbins | Dec. 16, 1952 |
| 2,877,621 | Robbins | Mar. 17, 1959 |

FOREIGN PATENTS

| | | |
|---|---|---|
| 337,085 | Great Britain | Oct. 30, 1930 |